US010331106B2

(12) United States Patent
Bernhard et al.

(10) Patent No.: US 10,331,106 B2
(45) Date of Patent: Jun. 25, 2019

(54) RACK STORAGE UNIT AND AUTOMATION SYSTEM

(71) Applicant: Maschinenfabrik Berthold Hermle AG, Gosheim (DE)

(72) Inventors: Franz-Xaver Bernhard, Spaichingen (DE); Tobias Schworer, Konigsheim (DE); Michael Dietmann, Hechingen (DE); Frank Bille, Gosheim (DE)

(73) Assignee: MASCHINENFABRIK BERTHOLD HERMLE AG, Gosheim (DE)

( * ) Notice: Subject to any disclaimer, the term of this patent is extended or adjusted under 35 U.S.C. 154(b) by 210 days.

(21) Appl. No.: 15/484,271

(22) Filed: Apr. 11, 2017

(65) Prior Publication Data

US 2017/0300031 A1 Oct. 19, 2017

(30) Foreign Application Priority Data

Apr. 19, 2016 (EP) ...................... 16165935

(51) Int. Cl.
*H02B 1/20* (2006.01)
*G05B 19/402* (2006.01)
*A47B 47/00* (2006.01)
*A47B 96/20* (2006.01)
*B21D 43/10* (2006.01)
*A47B 55/04* (2006.01)
*A47B 57/44* (2006.01)
*A47B 96/02* (2006.01)
(Continued)

(52) U.S. Cl.
CPC ............ *G05B 19/402* (2013.01); *A47B 47/00* (2013.01); *A47B 55/04* (2013.01); *A47B 57/44* (2013.01); *A47B 96/021* (2013.01); *A47B 96/024* (2013.01); *A47B 96/068* (2013.01); *A47B 96/20* (2013.01); *B21D 43/105* (2013.01); *B23Q 7/10* (2013.01); *A47B 2096/208* (2013.01); *G05B 2219/37582* (2013.01); *Y02P 90/265* (2015.11)

(58) Field of Classification Search
USPC ....................................................... 361/826
See application file for complete search history.

(56) References Cited

U.S. PATENT DOCUMENTS 3,643,814 A 2/1972 Martin
8,358,508 B2 * 1/2013 Nordin ................. G02B 6/4452
361/720
(Continued)

FOREIGN PATENT DOCUMENTS

DE 3320762 12/1984
DE 102009040811 3/2011
EP 1733840 12/2006
(Continued)

Primary Examiner — Hung S. Bui
(74) Attorney, Agent, or Firm — Hoffmann & Baron, LLP

(57) ABSTRACT

A rack storage unit for use in an automation system for a storage of work pieces and/or work piece pallets and/or tools, which includes a base frame with a rack stand and two rack side parts arranged at a distance from one another, wherein facing surfaces of the rack side parts are provided with interfaces for mounting placement devices. It is provided that the base frame is produced as a one-piece cast body from artificial stone, and that the interfaces are held by adhesive force as separately formed insert parts in the facing surfaces of the rack side parts.

19 Claims, 6 Drawing Sheets

(51) Int. Cl.
    *A47B 96/06*     (2006.01)
    *B23Q 7/10*     (2006.01)

(56) References Cited

U.S. PATENT DOCUMENTS 9,769,947 B1 *   9/2017   Sands .................. H05K 7/1491
2014/0234949 A1 *   8/2014   Wasson .............. G01N 35/1065
                                                                                                    435/287.2

FOREIGN PATENT DOCUMENTS

FR           2644336       9/1990
FR           2803728       7/2001

\* cited by examiner

RACK STORAGE UNIT AND AUTOMATION SYSTEM

BACKGROUND OF THE INVENTION

The invention relates to a rack storage unit for use in an automation system for a storage of workpieces and/or workpiece pallets and/or tools, comprising a base frame with a rack stand and two rack side parts arranged at a distance from one another, wherein surfaces of the rack side parts which face to each other are provided with interfaces for mounting placement devices. The invention further relates to an automation system with at least one such rack storage unit.

Automation systems are used for automatically changing workpieces and/or workpiece pallets and/or tools on machining units such as multiaxial machining centres, in particular milling and/or turning centres, and are provided with a rack storage unit with compartments with a plurality of storage locations for workpieces and/or workpiece pallets and/or tools. An automation system further comprises a manipulator, for example an industrial robot, for moving the workpieces and/or workpiece pallets and/or tools between the rack storage unit and the machining centre.

DE 33 20 762 A1, EP 1 733 840 A1, DE 10 2009 040 811 A1 and U.S. Pat. No. 3,643,814 A disclose rack storage units built up as metal part or prefabricated concrete part structures from many individual components, wherein manufacturing tolerances in the dimensions of the individual components add up in the assembly of the rack storage unit, so that each storage location has to be aligned and measured individually in order to facilitate a precise automated loading and unloading of the storage locations.

SUMMARY OF THE INVENTION

The invention is based on the problem of providing a rack storage unit and an automation system which can be produced cost-effectively with high precision.

For a rack storage unit of the type referred to above, this problem is solved with the following features: a rack storage unit for use in an automation system for a storage of work pieces and/or work piece pallets and/or tools, comprising a base frame with a rack stand and two rack side parts arranged at a distance from one another, wherein surfaces of the rack side parts facing each other are provided with interfaces for mounting placement devices, wherein the base frame is produced as a one-piece cast body from artificial stone and that the interfaces are separately formed insert parts which are held by adhesive force/bonding force in the surfaces of the rack side parts which surfaces facing to each other.

As the base frame is produced as a one-piece cast body from artificial stone, all reference surfaces and reference geometries required for a precise placement of the workpieces and/or workpiece pallets and/or tools in the rack storage unit are already created in the casting process for the base frame and determined by a reusable casting mould used for producing the base frame. These reference surfaces and reference geometries are therefore in mutual geometric relationships with tolerances which are exclusively determined by the tolerances of the casting mould and by the properties of the artificial stone material, which is initially introduced into the casting mould as a shapeless mass and then hardened therein. As a result of the one-piece design, there are therefore no influences from tolerances of individual components, which have to be taken into account in rack storage units according to the prior art and there either result in complex manufacturing processes for the individual components according to the prior art with the aim of providing tight tolerances from the start and/or result in elaborate measuring operations which have to be carried out when establishing the rack storage unit and integrating it into the automation system. Due to the use of the artificial stone material, the hardening of which is based on chemical binding processes with only minor thermal influences, only a slight thermal distortion has to be taken into account which is considerably less than a thermal distortion involved in the use of metal casting processes. The artificial stone material can furthermore be optimised for the application in terms of a coefficient of thermal expansion, which has to be taken into account if ambient temperatures fluctuate during the use of the rack storage unit, and/or in terms of material shrinkage in the hardening process, by selecting suitable additives. For a geometrically precise arrangement of placement devices on the rack side parts, the latter are provided with insert parts which may be metal parts in particular and held in the rack side parts by adhesive force. It is preferably provided that the insert parts are installed into the casting mould before the casting process for the initially shapeless artificial stone material, the casting mould being provided with suitable receptacles for the insert parts. In this way, a highly precise alignment of the insert parts to one another and to the rack side parts formed in the casting process can be ensured. The insert parts are furthermore advantageously joined directly by adhesive force to the artificial stone material in the hardening process, in which the initially shapeless artificial stone material becomes a rigid artificial stone body. It can further be provided that the insert parts have an external geometry which is profiled, in particular undercut, at least in some regions and which ensures a positive location of the insert parts in the artificial stone material. Depending on the chemical composition of the initially shapeless artificial stone material, there may be a slight shrinkage of the artificial stone material during the hardening process, which results, as it were, in a shrinking of the artificial stone material onto the insert parts, which likewise supports a reliable anchorage of the insert parts in the rack side parts.

Advantageous further developments of the invention are the subject matter of the dependent claims.

It is expedient if the artificial stone is a cement-containing or resin-bonded concrete and/or has a paintable surface. The artificial stone is formed from a mixture of a binder and a rock grain, wherein the rock grain, which is also described as aggregate, may be composed of gravel and sand, for example. Optional binders are cement or synthetic resin, for example; depending on the composition of the rock grain and the choice of binder as well as any chemical additives which may be used, this offers great freedom in setting the properties of the artificial stone. It is particularly advantageous if the artificial stone has a paintable surface, because this facilitates a cost-effective as well as a technically and visually high-quality finish for the base frame. With this finishing operation, a permanent seal of the base frame against environmental influences such as humidity and/or oil and/or oil mist and/or cooling lubricants as well as a visually attractive surface style of the base frame can be obtained.

In an embodiment of the invention, it is provided that the insert parts, which are combined to form insert part groups in particular, are designed as bushings, in particular threaded bushings, for the accommodation of support bars. With the aid of support bars, the bushings then allow placement devices to be mounted on the rack side parts in a great number of different positions, so that the placement devices can be arranged to suit the geometries of the items to be placed in the rack storage unit. The bushings are preferably sleeve-shaped, preferably metallic, components, in particular made of steel. At an outer surface in adhesive contact with the artificial stone, the spare parts can be provided with a coating for an advantageous adhesive joint with the artificial stone. In addition or as an alternative, the insert parts can be provided with a profiling on an outer surface for a reliable positive location in the artificial stone. This is particularly important if the insert parts are designed as threaded bushings and have therefore to be suitable for diverting torques involved in screwing processes into the artificial stone.

By way of example, it may be provided that the threaded bushes have a female thread for screw-mounting further components, in particular support bars, on the rack side parts by means of a suitable screw in particular. It is advantageous if the insert parts are flush in the rack side parts, so that their contour does not adversely affect the handling of items placed in or removed from the rack storage unit.

It is preferably provided that insert parts are provided with support bars which extend towards the opposite rack side part, and that a placement device accommodated between the rack side parts lies on at least three support bars. Preferably only those insert parts which will later carry placement devices will be provided with support bars in the rack side parts, while any surplus insert parts in the rack side parts are left without support bars. The support bars may be designed as circular cylindrical sleeves, for example, which are secured on the threaded bushing insert parts by machine screws. The at least one placement device for the accommodation of workpieces and/or workpiece pallets and/or tools, which is accommodated horizontally between the rack side parts, lies, in particular as a whole, on at least three support bars, ensuring a reliable introduction of the weight of the placement devices and of the workpieces and/or workpiece pallets and/or tools placed thereon. The placement device preferably lies on both sides on support bars arranged in pairs. In a particularly preferred embodiment, it is provided that the placement device preferably lies on both sides on three support bars each.

It is advantageous if the placement device lies between the opposite rack side parts on the support bars in a slidable manner, in particular with precisely one translational degree of freedom, and/or if the placement device positively encloses at least one support bar, which is designed as a guide bar for a linear guidance of the placement device. A slidable and therefore floating mounting of the placement devices relative to the rack side parts ensures a decoupling of forces which would otherwise be introduced from the placement devices into the rack side parts in the longitudinal direction of the support bars and result in undesirable bending moments acting on the rack side parts. Such forces occur if the respective placement device is deflected by being loaded with the workpieces and/or workpiece pallets and/or tools; in a full coupling between the placement device and the rack side parts, this would cause tensile forces to act on the rack side parts. It is preferably provided that the placement device has precisely one degree of freedom of movement against the rack side parts, this being a translational degree of freedom. By way of example, this can be achieved by having the placement device surround at least one of the support bars in such a way that in spatial directions away from the desired translational degree of freedom there is a positive coupling between the placement device and the support bar. By way of example, the placement device is for this purpose provided with a recess which matches an external geometry of the respective support bar, which can then be used as a guide bar for the linear guidance of the placement device.

In an advantageous further development of the invention, it is provided that the placement device is designed as a prismatic profiled part, preferably an extruded plastic profile part, particularly preferably an aluminium extrusion part, in particular a sheet steel profile part, with a cross-section which is constant along the distance of the rack side parts, and that it is at the ends provided with a support plate each arranged opposite the rack side part and having recesses for a coupling to the support bars. The placement device preferably has a plate-shaped base body provided for alignment in a horizontal plane, the top side of which is designed for placing the workpieces and/or workpiece pallets and/or tools and is flat for this purpose in the illustrated embodiment. On an underside of the base body, there may be provided supports or struts extending at right angles to the top side, which provide a stiffening for the base body. For the coupling to the support bars located in the rack side bars, the placement device comprises support plates at the ends, which can be provided with bores and/or laterally open recesses to ensure the desired, in particular floating, mounting on the placement devices on the rack side parts.

It is preferably provided that a location plate having a plurality of recesses for the location of workpiece pallets and at least one centring recess for the engagement of a centring element is provided on a top side of the placement device, wherein the centring element is fixed to the base frame and determines a position of the location plate relative to the base frame. The location plate has the purpose of determining the position of one or more workpiece pallets which can be accommodated in the recesses of the location plate. For as precise as possible a relationship between the recesses, which are preferably produced with high precision in the location plate, and the base frame, the location plate has at least one centring recess likewise produced with high precision and tight tolerances relative to the recesses. The centring recess has at least one reference surface designed for surface contact with a corresponding reference surface of a centring element which is in turn fixed to the base frame. This ensures a precise relationship between the high-precision locations for the centring elements, the location plate and the workpiece pallets fixed to the location plate.

In a further development of the invention, it is provided that each rack stand comprises stand blocks located below the rack side parts, and that a connecting plate is formed between a rack recess bounded by the rack side parts and a stand block recess bounded by the stand blocks. The stand blocks serve as a rest for the rack storage unit on a base, in particular on a machine frame or foundation, and divert the weight forces of the rack storage unit and the workpieces and/or workpiece pallets and/or tools accommodated therein into the base. For a stable composite of rack side parts and stand blocks, the connecting plate is provided, which extends with a largest surface preferably in a horizontal plane and is produced in one piece together with the rack side parts and the stand blocks as an artificial stone casting. By way of example, it can be provided that vertically adjustable feet for matching the height and/or the inclination of the rack storage unit to further machine components are mounted on an underside of the stand blocks remote from the rack side parts.

It is expedient that the stand blocks have on surfaces facing each other groove-like recesses which are in particular arranged in a mirror image fashion and designed for the engagement of forklift prongs for facilitating a transport of the complete rack storage unit by forklift truck.

It is preferably provided that front narrow surfaces of the rack side parts are located in a common interface plane with end faces of the stand blocks, and that the front narrow surfaces and/or the end faces are provided with coupling means and/or centring means, in particular with projections and/or recesses, which are designed for a mechanical connection to a machine component. In this way, an advantageous coupling between the rack storage unit and a machine component, in particular a machine bed of a manipulator, can be obtained. By way of example, it is provided that the interface planes of the rack storage unit and the machine component have mutually corresponding coupling and/or centring means for a precise alignment of the rack storage unit relative to the machine component for the formation of an automation system.

It is advantageous if the stand blocks and/or the rack side parts are provided on the back with a support plate which is strip-shaped in particular. This stabilises the rack storage unit. A largest surface of the support plate preferably extends parallel to an interface plane of the stand blocks and parallel to the front narrow surfaces of the rack side parts, in particular in a vertical spatial direction. By way of example, the support plate is strip-shaped, in particular with a rectangular cross-section, with a longest edge of the support plate preferably extending in the horizontal direction. The support plate preferably has a rectangular geometry.

In an advantageous further development of the invention, it is provided that the rack side parts are joined to a first support plate adjoining the stand blocks and to a second support plate in an end region remote from the stand blocks, and that a preferably rectangular recess, in particular covered by a transparent viewing window, is formed between the two support plates. With the aid of the first and the second support plate, which are arranged at a distance from each other and the longest edges of which are preferably oriented in a horizontal direction, a considerable stabilisation of the rack storage unit is achieved. A recess formed between the two support plates and preferably covered by a transparent viewing window for safety reasons furthermore allows the workpieces and/or workpiece pallets and/or tools in the rack storage unit to be viewed. In this way, an operator can gain a general view on the quantities stored in the rack storage unit at a given time.

In a further development of the invention, it is provided that the rack side parts have in an end region facing the stand blocks a wedge-shaped widening extending from a front narrow surface of the respective rack side part to an inner rear surface of the rack side part. This widening makes for an advantageous flow of forces between the rack side parts and the stand blocks, in particular in respect of bending moments which are introduced into the rack side parts and to be diverted into the stand blocks. For this, it is provided that a section of the rack side parts is widened in a wedge-shaped manner, preferably in the vertical direction, whereby a distribution of forces is obtained in a connecting region with the stand blocks, so that internal stresses in the artificial stone material always remain below a preset maximum stress level. The wedge-shaped widening preferably extends at least almost over the entire depth of the rack side parts to avoid undesirable stress peaks in the artificial stone material.

It is advantageous if the rack side parts are designed as prismatic profiled parts with an L-shaped cross-section, wherein a largest external side surface of the rack side part and an adjoining external rear surface of the rack side part are oriented at right angles to one another and/or wherein a largest internal side surface of the rack side part and an adjoining internal rear surface of the rack side part are oriented at right angles or at an obtuse angle to one another. The largest external side surface of the rack side part and the adjoining external rear surface of the rack side part are preferably flat. The largest internal side surface of the rack side part, on which the insert parts are located and the support bars can be mounted, is preferably flat. By way of example, it can be provided that the largest internal side surface encloses an acute angle with the largest external side surface, so that the rack side part tapers slightly from the internal rear surface towards the front narrow surface, which can support a demoulding from the casting mould. By way of example, it can further be provided that the internal rear surface of the rack side part is oriented parallel to the external rear surface of the rack side part.

In a further development of the invention, it is provided that the internal rear surface of the rack side part is provided with a taper extending towards an end region of a shorter L-leg, in particular with a sloping surface. This taper facilitates an advantageous flow of forces at a transition between the rack side part and the support plates, if provided. This is particularly important if the shorter L-leg has between the internal and the external rear surface a thickness amounting to 1.5 to 3 times a material thickness between the largest external side surface and the largest internal side surface of the rack side part. By means of this taper, local peak forces can be avoided in the artificial stone material, which could otherwise cause local damage to the rack storage unit.

For an automation system of the type referred to above, the problem of the invention is solved with an automation system which is designed for the automatic change of workpieces and/or workpiece pallets and/or tools on at least one machining unit, in particular a machine tool, and comprises a manipulator, in particular an industrial robot, and at least one rack storage unit according to the aforementioned invention. With the aid of the manipulator, which may be designed as a multiaxial industrial robot in particular, the workpieces and/or workpiece pallets and/or tools can be fed from the rack storage unit to a machining unit or placed in the rack storage unit for storage in a reverse operation. It is advantageous if the manipulator is accommodated on a machine bed, in particular made of artificial stone, which comprises a mechanical interface matched to the rack storage unit. This ensures a reliable and precise positioning of the rack storage unit relative to the manipulator, using coupling and/or centring means provided at opposite interfaces of the rack storage unit and the machine bed.

BRIEF DESCRIPTION OF THE DRAWINGS

An advantageous embodiment of the invention is illustrated in the drawing, of which.

DETAILED DESCRIPTION

Figure 1:
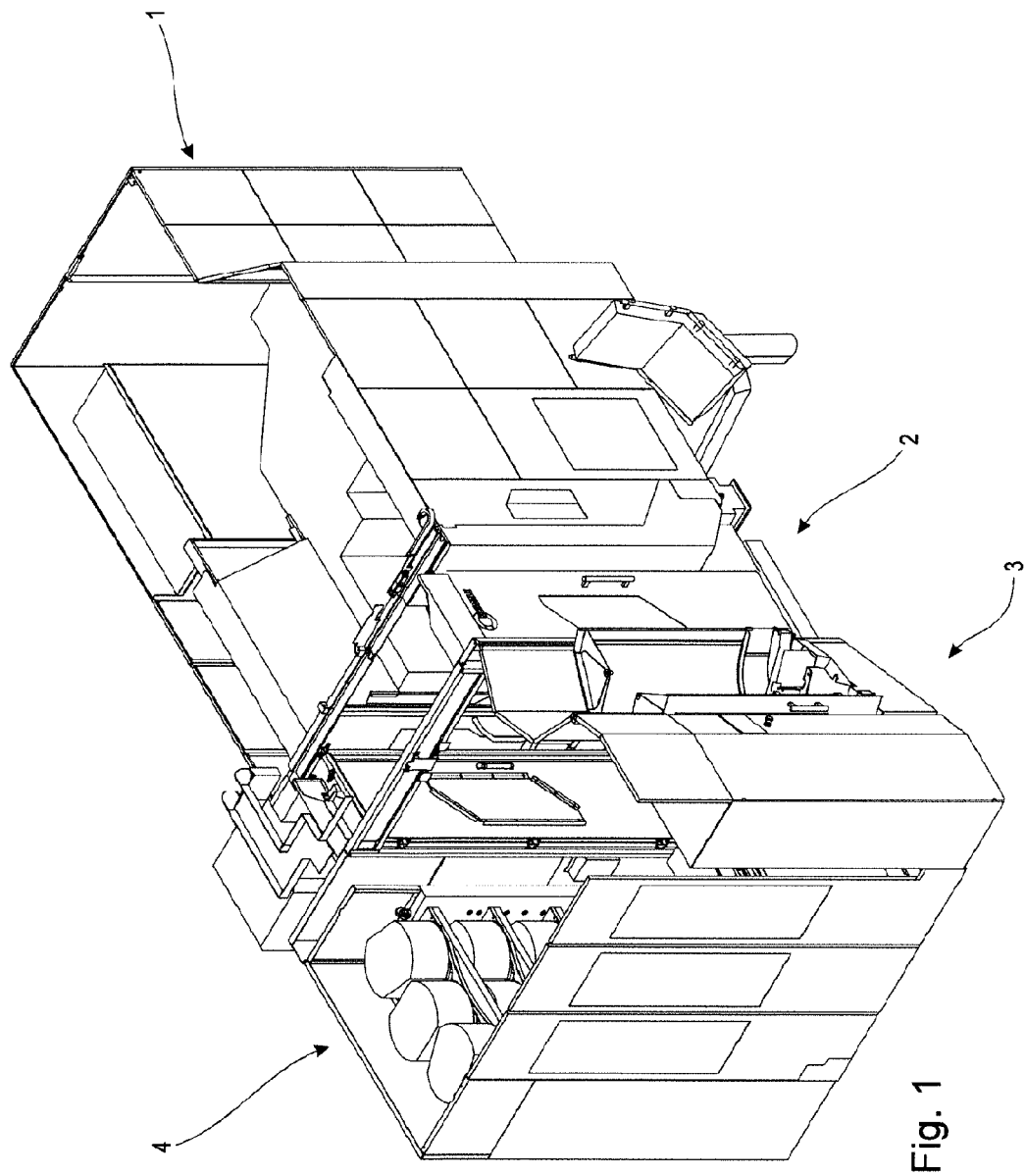
FIG. 1 is a perspective view of a machining unit with an automation system coupled thereto.

In the illustrated embodiment, a machining unit 1 shown in FIG. 1 is designed as a machining centre for milling operations and provided with a lock device 2, through which the workpieces and tools not shown in detail can be fed into a machining space not shown in detail of the machining unit 1 and removed therefrom. The lock device 2 is coupled to an automation system 3, which has the task of making the workpieces and tools available to the machining unit 1 and of removing them from the machining unit 1. The automation system 3 comprises a manipulator not shown in detail, in particular an industrial robot, which is used for moving the workpieces and tools, and a rack storage unit 4, which will be described in detail below. By combining the machining unit 1 with the lock device 2 and the automation system 3, an extended autonomous operation of the machining unit 1 can be ensured in particular. In this, several workpieces can be taken from the rack storage unit 4 consecutively and fed into the machining space of the machining unit 1, and machined workpieces can be removed from the machining space and returned to the rack storage unit 4. In order to ensure a targeted machining of the workpieces, it is advantageous if the workpieces are placed in the rack storage unit 4 in precisely presettable positions, so that there is ideally no need for additional measures for orienting the workpieces while they are being fed into the machining space of the machining unit 1, and the respective workpiece can rather be machined immediately.

Figure 2:
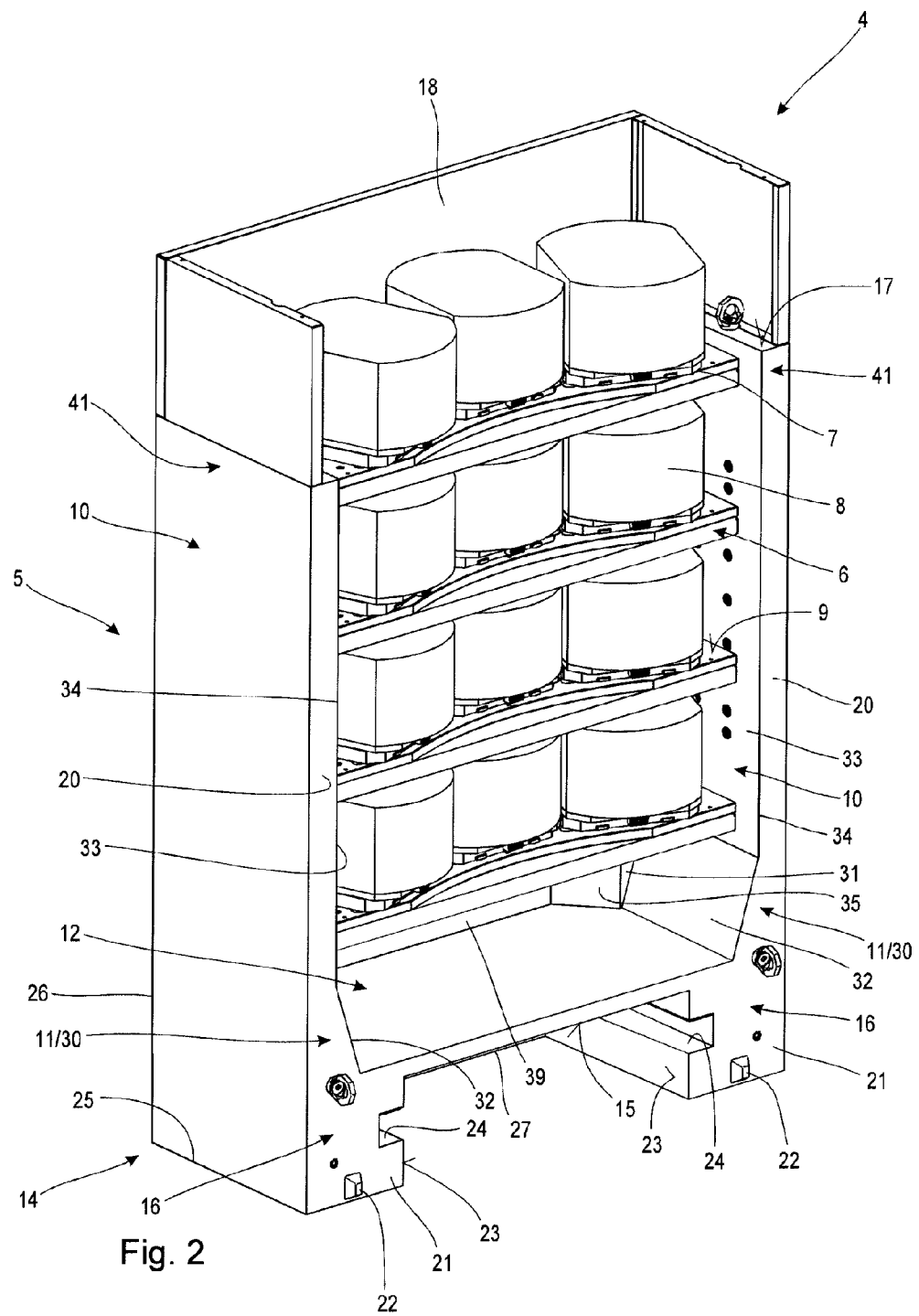
FIG. 2 is a perspective view of a rack storage unit for use in the automation system according to FIG. 1.

According to FIG. 2, the rack storage unit shown in greater detail in FIGS. 2 to 7 comprises a base frame 5, which accommodates a plurality of placement devices 6 with location plates 70, which placement devices 6, purely by way of example, support three workpiece pallets 7 each with workpieces 8. Each of the placement devices has a flat largest surface 9 serving as a locating surface for the respective location plates 70, which can in turn be used for depositing the workpiece pallets 7, and the largest surface 74 of which is preferably oriented horizontally.

The terms "horizontal" and "vertical" as used in the following description are assigned to a typical application of the rack storage unit 4, in which the rack storage unit 4 is used in a way shown in FIG. 1 by way of example.

The base frame 5 made of artificial stone is substantially U-shaped, free U-legs of the base frame 5 being represented by rack side parts 10, which are connected to one another in bottom end regions 11 by connecting plates 12. On an underside 15 of the connecting plate 12, stand blocks 16 are formed as extensions of the rack side parts 10. The connecting plate 12 and the stand blocks 16 form a rack stand 14 on which the rack side parts 10 are mounted.

On top sides 12 of the rack side parts 10, which are oriented horizontally and flat in the illustrated embodiment, a protective cover 18 open towards the top and the front is provided to shield the top row of workpieces 8. The protective cover 18 may be a bent sheet metal part, for example, and bolted to the top sides 17 of the rack side parts 10.

Front narrow surfaces 20 of the rack side parts 10 are, purely by way of example, located in a common interface plane (not described in detail) with end faces 21 of the stand blocks 16 and can be used for coupling the rack storage unit 4 to a correspondingly designed interface plane (not shown) of the manipulator of the automation system 3. In the illustrated embodiment, it is provided that a projection 22 in the form of a truncated pyramid is formed on each end face 21 of the stand blocks 16, which projection 22 can engage with a corresponding recess (not shown) on the manipulator of the automation system 3, in order to ensure a precise positioning of the rack storage unit 4 relative to the automation system 3.

Figure 3:
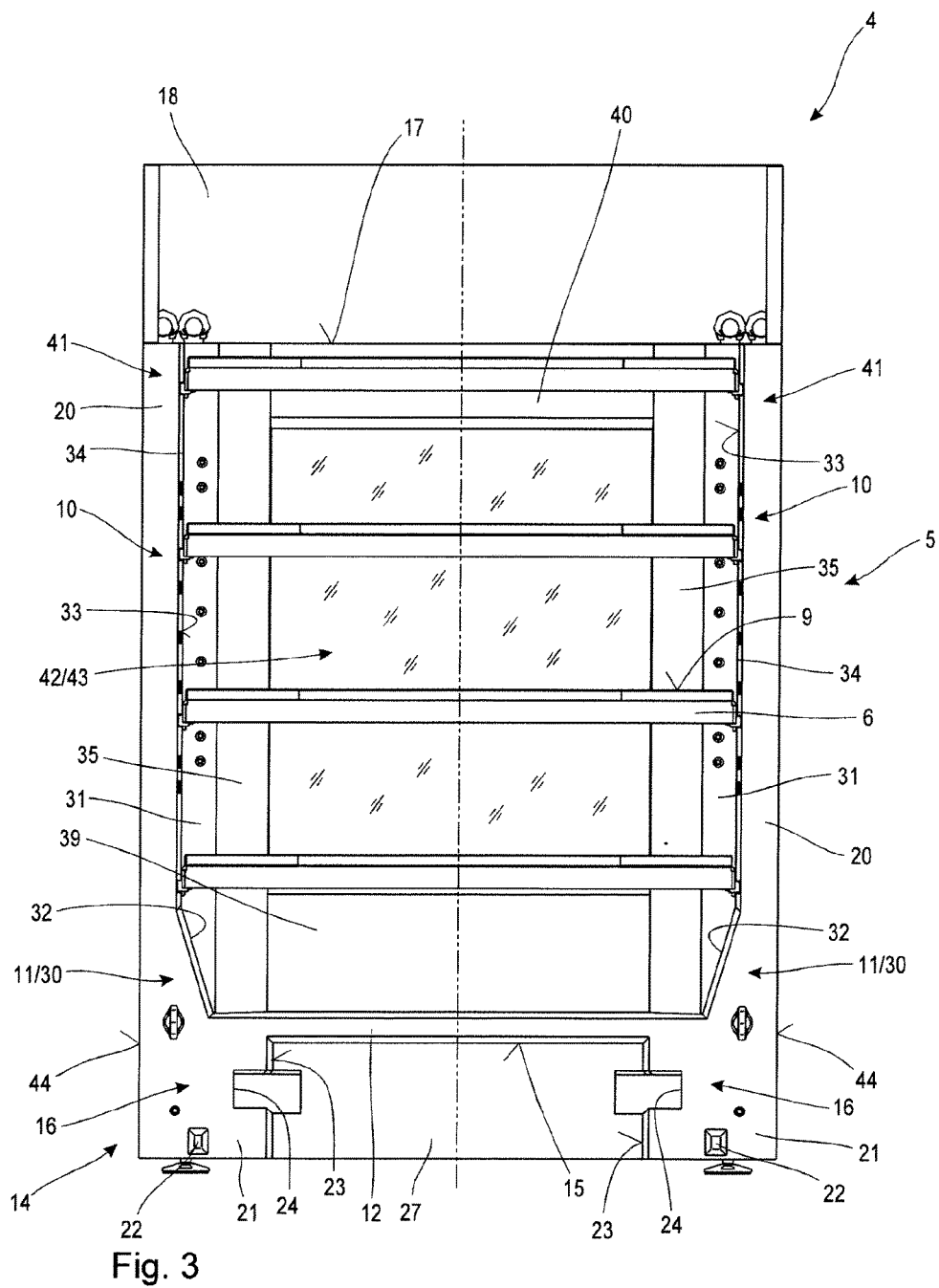
FIG. 3 is a front view of the rack storage unit according to FIG. 2, but without workpieces and workpiece pallets.

As the illustrations of FIGS. 2 and 3 show, the stand blocks 16, which are rectangular purely by way of example, have groove-like recesses 24 in opposite surfaces 23, which recesses 24 extend along the longest edge 25 of the stand blocks 16 in the illustrated embodiment. The dimension of this longest edge 25 will hereinafter also be described as the depth of the rack storage unit 4.

Figure 4:
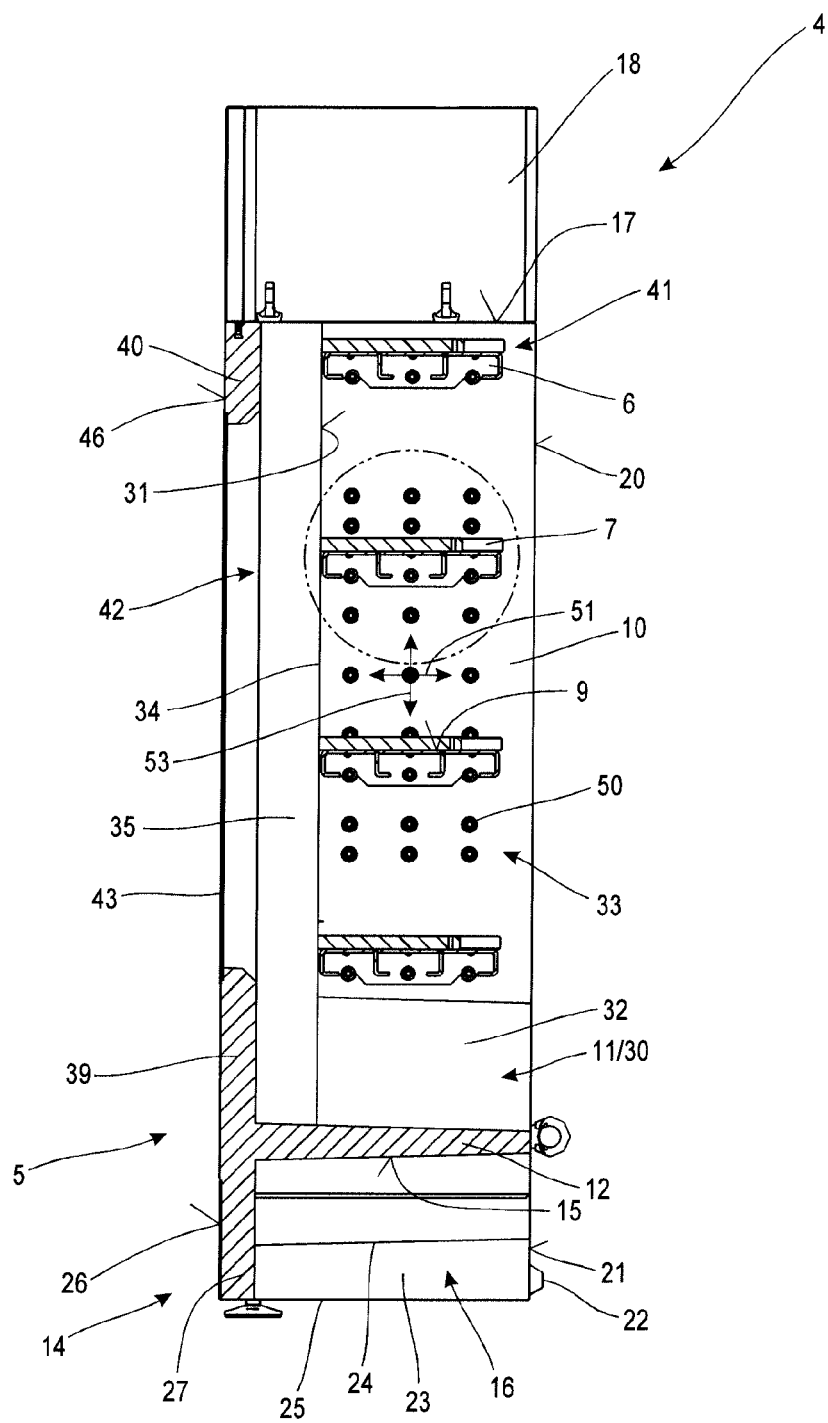
FIG. 4 is a vertical sectional view of the rack storage unit according to FIG. 3.

At a rear side 26 remote from the end face 21 of the stand blocks 16, which can be seen particularly clearly in FIG. 4, there extends between the stand blocks 16 a bottom support plate 27, which, according to the sectional view of FIG. 4, has a constant—in the illustrated embodiment rectangular—cross-section and therefore a constant wall thickness and through which groove-shaped recesses 24 pass as shown in FIG. 4. The groove-shaped recesses 24 permit the engagement of forklift prongs (not shown) with the rack storage unit 4 for transporting the rack storage unit 4 in an advantageous way. It is particularly preferred if the groove-shaped recesses have a slight taper starting from the rear side 26 towards the end face 21 of the stand blocks 16, in order to ensure an advantageous matching to a typical profiling of the prongs of the forklift truck and thus as slight as possible a tilt for the rack storage unit 4 when being transported on a forklift truck.

The illustrations of FIGS. 2 and 3 further show that the rack side parts 10 have a wedge-shaped widening 30 in their vertical dimension in the end region 11 close to the stand blocks 16. In addition, this widening 30 extends in the horizontal direction from the front narrow surface 20 of the respective rack side part 10 to an internal rear surface 31 of the rack side part 10, which can be seen in FIGS. 3, 4, 5 and 6. The widening 30 makes for an advantageous flow of forces between the rack side parts 10 and the stand blocks 16. In the illustrated embodiment, it is provided that, owing to the widening 30, a sloping surface 32 adjoins a largest internal side surface 33 of the rack side part 10 and encloses with the internal side surface 33 an obtuse angle of approximately 165 degrees in the illustrated embodiment. As FIGS. 2, 3 and 4 show, the sloping surface 32 adjoins, like the largest internal side surface 33, the internal rear surface 31, the longest edge 34 of which extends parallel to the largest internal side surface 33, at a right angle. In FIG. 3, it can be seen that the internal rear surface 31 is, purely by way of example, strip-shaped and flat and tapers in the bottom end region 11 owing to the widening 30 of the rack side parts 10.

Figure 5:
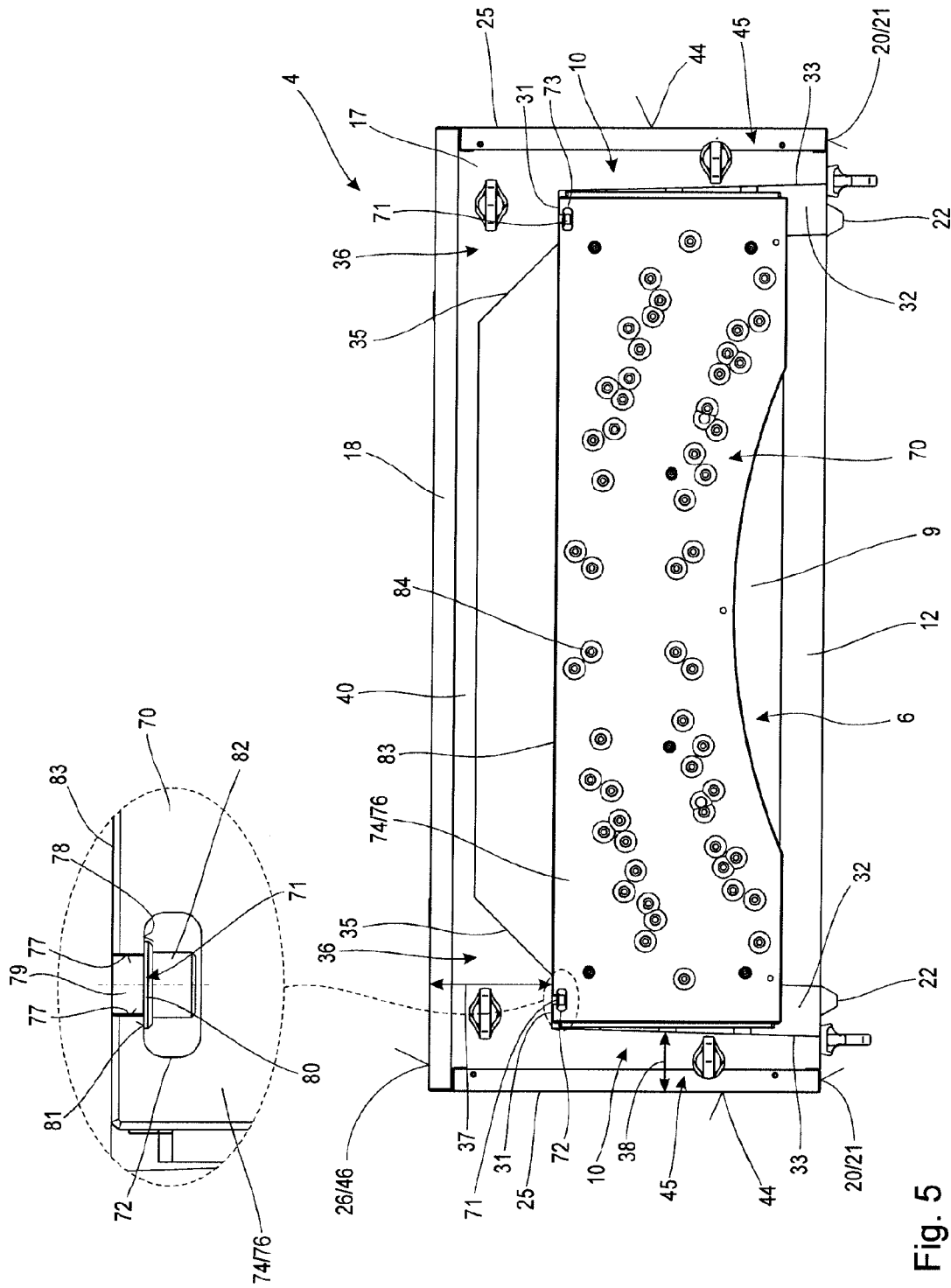
FIG. 5 is a top view of the rack storage unit according to FIG. 3, with an enlarged detail for a region of a location plate.

The illustrations of FIGS. 2, 3, 4 and 5 further show that the internal rear surface 31 is adjoined by a second sloping surface 35, the longest edge of which is identical with the longest edge 34 of the internal rear surface 31 and which bounds a wedge-shaped end taper of a shorter L-leg 36 of the L-shaped profiling of the rack side part 10 which can be seen in FIG. 5. Owing to the design of the shorter L-leg 36 of the rack side part 10 according to the illustrated embodiment, with a wall thickness 37 which approximately corresponds to twice the wall thickness 38 of a longer L-leg 45 of the L-shaped rack side part 10, the shorter L-leg 36 greatly contributes to an increase of the flexural rigidity of the rack side part 10 against bending forces oriented normal to the largest internal side surface 33.

A further stabilisation of the two opposite rack side parts 10 is obtained by support plates 39, 40 as shown in FIGS. 4 and 5. The middle support plate 39, which can also be described as the first support plate 39 of the rack side parts 10, immediately adjoins the bottom support plate 27 of the stand blocks 16 and has, according to the illustration of FIG. 4, an at least substantially rectangular profiling. The top support plate 40, which can also be described as the second support plate 40 of the rack side parts 10, extends between the opposite rack side parts 10, for example in an upper end region 41, and is flush with the top side 17 of the rack side parts 10. The two support plates 39, 40, together with the short L-kegs 36 of the rack side parts 10, bound a recess 42, which is rectangular purely by way of example. This recess 42 serves as a viewing window for the workpieces 8 in the rack storage unit 4 and is covered by a transparent pane 43 for safety reasons in the illustrated embodiment for safety reasons.

The respective longer L-leg 45 of the rack side part 10 is, according to the top view of FIG. 5, tapered starting from the shorter L-leg 36 towards the front narrow surface 20 purely by way of example. The mutually opposite largest internal side surfaces 33 of the rack side parts 10 enclose an acute angle of e.g. approximately 4 degrees, while largest external side surfaces 44 of the rack side parts 10, which face away from one another, are flat and oriented parallel to one another purely by way of example. Purely by way of example, it is further provided that the external side surfaces 44 of the rack side parts 10 are oriented perpendicular to the external rear surfaces 46 of the rack side parts 10.

The illustrations of FIGS. 2, 4, 6 and 7 show that the largest internal side surface 33 of the rack side part 10 is provided with a plurality of insert parts 50, which are arranged in the manner of a grid purely by way of example. In the illustrated embodiment, the insert parts 50 have a first pitch 52 in a horizontal direction 51 and a second pitch 54 in a vertical direction 53. In the illustrated embodiment, the insert parts 50 are designed as threaded bushings with a female thread 55 and are placed in a casting mould not shown in the drawing before it is filled with the initially shapeless artificial stone material for an adhesive joint with the artificial stone material. In the illustrated embodiment, it is provided that longitudinal axes 56 of the insert parts 50 are oriented parallel to a spacing (not shown in the drawing) of the opposite largest internal side surfaces 33 of the rack side parts 10, so that mutually opposite insert parts 50 of the opposite rack side parts 10 have coaxial longitudinal axes 56. It is preferably provided that the insert parts 50 are offset towards the rear relative to the largest internal side surfaces 33 and that an annular end face (not shown in detail) of the insert parts 50 is in each case arranged in a contact plane (not shown) oriented transversely to the longitudinal axis 56.

Figure 7:
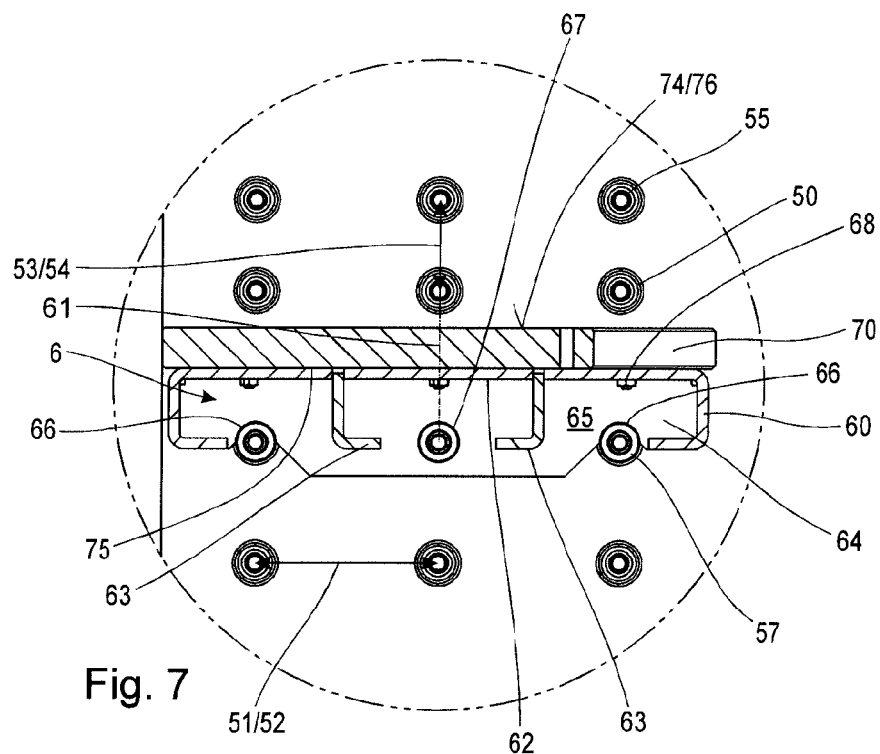
FIG. 7 shows an enlarged section of the rack side part with a placement device fitted thereto according to FIG. 4.
Figure 6:
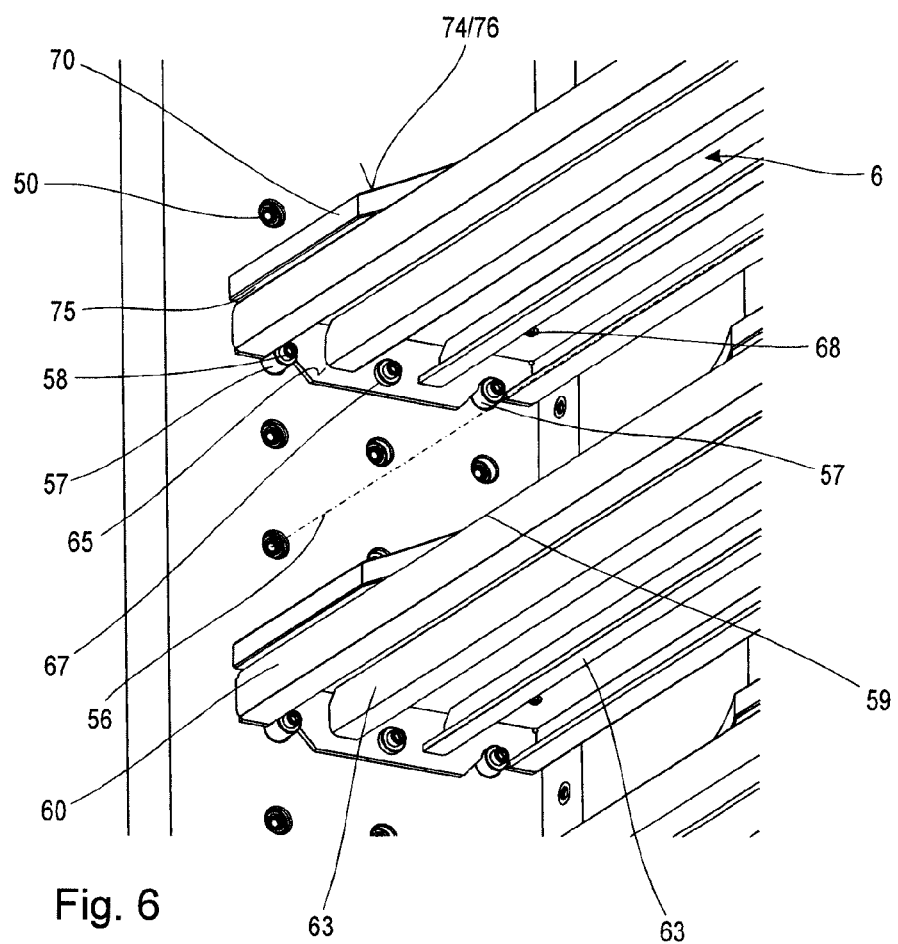
FIG. 6 is an enlarged perspective view of the mounting of two placement devices on a rack side part.

As FIGS. 6 and 7 show, for the location of the placement devices 6, three insert parts 50 each arranged next to one another in the horizontal direction 51 are fitted with support bars 57, which may be designed as circular cylindrical sleeves, for example, and are secured to the respective insert parts 50 by machine screws 58. With an end face not shown in detail, the respective support bar 57 is supported on the opposite and corresponding annular end face (not identified in the drawing) of the insert part 50.

FIGS. 6 and 7 show the profiling of the placement device 6. Purely by way of example, the placement device 6 comprises a sheet metal part 60, which is in each case bent in a U-shape at the ends along a longest edge 59 and the largest surface of which forms the surface of the placement device 6. Symmetrically distanced from a central axis 61, L-shaped reinforcement profiles 63, which can be welded to the sheet metal part 60 by way of example, are arranged in a mirror-image configuration on an underside 62 of the sheet metal part 60. At the ends, each sheet metal part 60 is assigned a support plate 64, the largest surface 65 of which is oriented transversely to the longest edge 59 and which has two open recesses 66 and a closed recess 67 arranged in the centre purely by way of example and designed as a bore in the support plate 64. Both the open recesses 66 and the closed recess 67 facilitate a linear mobility of the respective support plate 64 relative to the support bars 57. While the open recesses 66 would additionally allow a movement of the support plate 64 in at least one second spatial direction, the closed recess 67 limits the mobility of the support plate 64 relative to the support bars 57 to precisely one linear freedom of movement.

For locating the placement device 6 between the rack side parts 10, it can be provided that the two outer support bars 57 are first bolted to the rack side parts 10, whereupon the placement device 6 is placed on top. In this process, the open recesses 66 come into contact with the two outer support bars 57. For a reliable security of the placement device 6, a further support bar 57 is then pushed through the close recess 67 and bolted to the insert part 10.

Purely by way of example, as shown in FIG. 6, several threaded bushings 68 are provided on the placement device 6; these are provided for mounting a location plate 70, which in turn facilitates a location of workpiece pallets 7.

As the enlarged detail of FIG. 5 shows, the location plate 70, which is preferably implemented as a plane parallel plate with a flat underside 75 and a flat top side 76, is provided with centring recesses 72, 73 represented by through-holes in the illustrated embodiment. The centring recesses 72, 73 have a T-shaped cross-section by way of example, with opposite side surfaces 77 and an adjoining internal surface 78 being designed as reference surfaces for a positive engagement of a centring pin 71. In the illustrated embodiment, the centring pin 71 is screwed, using a machine screw 82, into an insert part 50 provided on the internal surface 31 of the base frame 5 and serves as a mechanical reference between the base frame 5 and the location plate 70. For this purpose, the centring pin 71 has a circular cylindrical shank section 79 and a continuous annular collar 80, which axially bounds the shank section 79 and has an annular surface 81. The annular collar 80 is provided for location between the two side surfaces 77 of the location plate 70 and thereby secures an alignment of the location plate 70 relative to the base frame 5 in the direction of a longest edge 83 of the location plate 70. The annular surface 81 is provided for contact with the internal surface 78 of the respective centring recess 72, 73 and thereby secures the alignment of the location plate 70 in the horizontal direction transversely to the longest edge 83.

It is preferably provided that, as in the illustrated embodiment, the tolerance for a distance of the side surfaces 77 of the centring recess 72 from an external diameter of the shank section 79 is chosen to be very tight, so that the interaction of the shank section 79 and the side surfaces 77 of the centring recess 72 creates a fixed bearing whereby the position of the location plate 70 relative to the base frame 5 is fixed in the direction of the longest edge 83. In the same way, it can be provided that a length of the shank section 79 and a distance of the internal surface 78 from the longest edge 83 for the centring recess 72 are subjected to tight tolerances, so that a fixed bearing is created in the horizontal direction transverse to the longest edge 83 as well for determining the position of the location plate 70 relative to the base frame 5 in the horizontal direction transverse to the longest edge 83. It can further be provided that the tolerances for the distance of the side surfaces 77 at the centring recess 73 and the distance between the longest edge 83 and the internal surface 78 of the centring recess 73 are chosen such that, together with the centring pin 71, a floating bearing is created both along the longest edge 83 and at right angles thereto, in order to avoid a static conformity for the location plate 70 relative to the base frame 5. It can further be provided that, for fitting the location plate 70 to the placement device 6, the location plate 70 is first suspended with its centring recesses 72, 73 on the centring pins 71 and only then bolted to the placement device 6. The workpiece pallets 7 can then be located in a way not shown in detail in the recesses 84 of the location plate 70, which may, for example, be represented by blind holes.

The rack storage unit described in detail below comprises a base frame which, in contrast to earlier designs, does not consist of a plurality of components and assemblies and does not have to be assembled in complex steps, but is produced as a complete component in a casting process. This considerably reduces the effort and expenditure involved in its final assembly. Using modern casting methods, the casting can be produced with such a high precision that the cast part does not require any finishing operations in the assembly of the rack storage unit. Using coupling and/or centring means, the base frame furthermore can be fitted to adjoining assemblies of the automation system with adequate positional accuracy. This minimises the effort and cost involved in installing and measuring operations during the erection of the automation system. Although the artificial stone base frame consists of a single prefabricated component, the placement devices can be adapted flexibly to different heights with the insert parts, depending on the items to be stored. The cast base frame is paintable, so that there is hardly any need for sheet metal cladding for visual and safety reasons.

The term "automation system" describes a system which is functionally linked to a machining unit, preferably a machine tool. The automation system takes over the task of providing workpieces and/or tools for the machining unit in at least one rack storage unit and of automatically exchanging them with the machining centre as required. The term covers automation systems which can exchange individual workpieces and/or workpieces placed on palettes.

The term "rack storage unit" describes a rack for an automation system which contains the required components for automatic loading and unloading with a handling device or an industrial robot. A rack storage unit in particular comprises a secure rack stand, left-hand and right-hand rack side parts and placement devices with one or more storage locations for tools, workpieces and/or workpiece pallets. The rack storage unit may further comprise devices for transporting it and/or a viewing window and/or mechanical interfaces for connecting the rack storage unit to further assemblies of the automation system and/or a sheet metal cladding on the top side.

The term "base frame" describes a structure which comprises the rack side parts and the rack stand, the rack stand being the assembly which carries the weight of the rack storage unit. The rack stand may, for example, stand on the floor with additional feet and/or joined to a further assembly adjoining the rack storage unit via connecting elements.

The term "artificial stone" in particular describes a mineral- or polymer-bonded material with mineral aggregates, which is shaped in a casting process. This includes e.g. cement-containing or resin-bonded concrete materials, such as mineral casting (polymer concrete).

The term "floating mounting" describes an arrangement with one or more floating bearings in at least one axial direction. The placement devices 6 are displaceable along the longitudinal axis 56 and therefore mounted in a floating manner on the rack side parts 10. In this way, an introduction of tensile forces from the placement device 6 into the rack side parts 10, which could result from a deflection of the placement device 6, is avoided.

LIST OF REFERENCE NUMBERS

1 Machining unit
2 Lock device
3 Automation system
4 Rack storage unit
5 Base frame
6 Placement device
7 Workpiece pallet
8 Workpiece
9 Surface
10 Rack side part
11 End region
12 Connecting plate
13
14 Rack stand
15 Underside
16 Stand block
17 Top side
18 Protective cover
19
20 Front narrow surface
21 End face
22 Projection
23 Surface
24 Recess
25 Longest edge
26 Rear side
27 Support plate
28
29
30 Widening
31 Internal rear surface
32 Sloping surface
33 Largest internal side surface
34 Longest edge
35 Sloping surface
36 Shorter L-leg
37 Wall thickness
38 Wall thickness
39 Central support plate
40 Top support plate
41 Top end region
42 Recess
43 Transparent viewing window
44 Largest external side surface
45 Longer L-leg
46 External rear surface
47
48
49
50 Insert part
51 Horizontal direction
52 First pitch
53 Vertical direction
54 Second pitch
55 Female thread
56 Longitudinal axis
57 Support bar
58 Machine screws 59 Longest edge
60 Sheet metal part
61 Central axis
62 Underside
63 Reinforcing profile
64 Support plate
65 Largest surface
66 Open recess
67 Closed recess
68 Threaded bushing
69
70 Location plate
71 Centring pin
72 Centring recess
73 Centring recess
74 Largest surface
75 Underside
76 Top side
77 Side surface
78 Internal surface
79 Shank section
80 Annular collar
81 Upper end region
82 Machine screw
83 Longest edge
84 Recess

What is claimed is:

1. A rack storage unit for use in an automation system for a storage of work pieces and/or work piece pallets and/or tools, the rack storage unit comprising a base frame with a rack stand and two rack side parts arranged at a distance from one another, wherein surfaces of the rack side parts facing each other are provided with interfaces for mounting placement devices, and wherein the base frame is produced as a one-piece cast body from artificial stone, and wherein the interfaces are held by adhesive force as separately formed insert parts in the surfaces of the rack side parts facing each other,
wherein the artificial stone is a cement-containing or resin-bonded concrete and/or has a paintable surface.

2. The rack storage unit according to claim 1, wherein the rack side parts are designed as prismatic profiled parts with an L-shaped cross-section, wherein a largest external side surface of the rack side part and an adjoining external rear surface of the rack side part are oriented at right angles to one another and/or wherein a largest internal side surface of the rack side part and an adjoining internal rear surface of the rack side part are oriented at right angles or at an obtuse angle to one another.

3. An automation system for the automatic change of work pieces and/or work piece pallets and/or tools on at least one machine tool, comprising an industrial robot, and at least one rack storage unit according to claim 1.

4. A rack storage unit for use in an automation system for a storage of work pieces and/or work piece pallets and/or tools, the rack storage unit comprising a base frame with a rack stand and two rack side parts arranged at a distance from one another, wherein surfaces of the rack side parts facing each other are provided with interfaces for mounting placement devices, and wherein the base frame is produced as a one-piece cast body from artificial stone, and wherein the interfaces are held by adhesive force as separately formed insert parts in the surfaces of the rack side parts facing each other,
wherein the insert parts are designed as bushings for the accommodation of support bars.

5. The rack storage unit according to claim 4, wherein the insert parts are combined to form insert part groups.

6. The rack storage unit according to claim 4, wherein the insert parts are designed as threaded bushings.

7. The rack storage unit according to claim 4, wherein insert parts are provided with support bars which extend towards the opposite rack side part, and wherein a placement device accommodated between the rack side parts lies on at least three support bars.

8. The rack storage unit according to claim 7, wherein the placement device lies between the opposite rack side parts on the support bars in a slidable manner, and/or wherein the placement device positively encloses at least one support bar, which is designed as a guide bar for a linear guidance of the placement device.

9. The rack storage unit according to claim 7, wherein the placement device is designed as a prismatic profiled part with a cross-section which is constant along the distance of the rack side parts, and wherein it is at the ends provided with a support plate each arranged opposite the rack side part and having recesses for a coupling to the support bars.

10. The rack storage unit according to claim 7, wherein a location plate having a plurality of recesses for the location of work piece pallets and at least one centring recess for the engagement of a centring element is provided on a top side of the placement device, wherein the centring element is fixed to the base frame and determines a position of the location plate relative to the base frame.

11. A rack storage unit for use in an automation system for a storage of work pieces and/or work piece pallets and/or tools, the rack storage unit comprising a base frame with a rack stand and two rack side parts arranged at a distance from one another, wherein surfaces of the rack side parts facing each other are provided with interfaces for mounting placement devices, and wherein the base frame is produced as a one-piece cast body from artificial stone, and wherein the interfaces are held by adhesive force as separately formed insert parts in the surfaces of the rack side parts facing each other,
wherein each rack stand comprises stand blocks located below the rack side parts, and wherein a connecting plate is formed between a rack recess bounded by the rack side parts and a stand block recess bounded by the stand blocks, and/or wherein the stand blocks comprise, on surfaces facing each other, groove-like recesses which are designed for the engagement of forklift prongs for facilitating a transport of the complete rack storage unit by forklift truck.

12. The rack storage unit according to claim 11, wherein front narrow surfaces of the rack side parts are located in a common interface plane with end faces of the stand blocks, and wherein the front narrow surfaces and/or the end faces are provided with coupling means and/or centring means, which are designed for a mechanical connection to a machine component.

13. The rack storage unit according to claim 12, wherein the coupling means are projections and/or the centring means are recesses.

14. The rack storage unit according to claim 11, wherein the stand blocks and/or the rack side parts are joined on the back to a support plate.

15. The rack storage unit according to claim 14, wherein the support plate is strip-shaped.

16. Rack storage unit according to claim 14, wherein the rack side parts are joined to a first support plate adjoining the stand blocks and to a second support plate in an end region remote from the stand blocks, and wherein a rectangular recess is formed between the two support plates.

17. The rack storage unit according to claim 11, wherein the rack side parts have, in an end region facing the stand blocks, a wedge-shaped widening extending from a front narrow surface of the respective rack side part to an internal rear surface of the rack side part.

18. A rack storage unit for use in an automation system for a storage of work pieces and/or work piece pallets and/or tools, the rack storage unit comprising a base frame with a rack stand and two rack side parts arranged at a distance from one another, wherein surfaces of the rack side parts facing each other are provided with interfaces for mounting placement devices, and wherein the base frame is produced as a one-piece cast body from artificial stone, and wherein the interfaces are held by adhesive force as separately formed insert parts in the surfaces of the rack side parts facing each other, wherein the rack side parts are designed as prismatic profiled parts with an L-shaped cross-section, wherein a largest external side surface of the rack side part and an adjoining external rear surface of the rack side part are oriented at right angles to one another and/or wherein a largest internal side surface of the rack side part and an adjoining internal rear surface of the rack side part are oriented at right angles or at an obtuse angle to one another, and wherein the internal rear surface of the rack side part is provided with a taper extending towards an end region of a shorter L-leg.

19. The rack storage unit according to claim 18, wherein the internal rear surface of the rack side part is provided with a sloping surface.

* * * * *